United States Patent
Singhal

(10) Patent No.: US 9,800,699 B2
(45) Date of Patent: Oct. 24, 2017

(54) APPARATUS AND METHOD FOR AN ALTERNATE FORM-FACTOR HANDHELD SMART PHONE DEVICE

(71) Applicant: Tara Chand Singhal, Torrance, CA (US)

(72) Inventor: Tara Chand Singhal, Torrance, CA (US)

(*) Notice: Subject to any disclaimer, the term of this patent is extended or adjusted under 35 U.S.C. 154(b) by 0 days.

(21) Appl. No.: 14/832,629

(22) Filed: Aug. 21, 2015

(65) Prior Publication Data
US 2016/0021225 A1 Jan. 21, 2016

Related U.S. Application Data

(62) Division of application No. 13/735,326, filed on Jan. 7, 2013, now abandoned.

(60) Provisional application No. 61/644,993, filed on May 9, 2012.

(51) Int. Cl.
*H04M 1/02* (2006.01)
*H04M 1/725* (2006.01)

(52) U.S. Cl.
CPC ......... *H04M 1/026* (2013.01); *H04M 1/0256* (2013.01); *H04M 1/7253* (2013.01)

(58) Field of Classification Search
CPC .................................................. H04M 1/0214
See application file for complete search history.

(56) References Cited

U.S. PATENT DOCUMENTS

| | | | | |
|---|---|---|---|---|
| D298,033 S | * | 10/1988 | Hotsumi | H04M 1/00 D14/138 AA |
| D300,218 S | * | 3/1989 | Skrypalle | H04M 1/00 455/550.1 |
| D304,939 S | * | 12/1989 | Sutoh | H04M 1/00 379/433.01 |
| D306,291 S | * | 2/1990 | Watanabe | H04M 1/00 379/433.01 |
| D325,577 S | * | 4/1992 | Karlin | H04M 1/00 D14/138 AA |
| 8,391,934 B1 | * | 3/2013 | Chan | H04M 1/0254 455/550.1 |
| 8,909,307 B2 | * | 12/2014 | Chan | H04M 1/0254 455/550.1 |
| 2003/0040345 A1 | * | 2/2003 | Berger | H01Q 1/245 455/575.1 |
| 2004/0266480 A1 | * | 12/2004 | Hjelt | G06F 1/1632 455/558 |
| 2006/0286943 A1 | * | 12/2006 | Vance | A63F 13/06 455/90.1 |
| 2008/0311963 A1 | * | 12/2008 | Strawn | H04M 1/0235 455/575.1 |
| 2010/0258626 A1 | * | 10/2010 | Watanabe | H01M 2/1066 235/380 |
| 2011/0186356 A1 | * | 8/2011 | Sheikh | G01G 19/414 177/25.13 |

(Continued)

*Primary Examiner* — Bobbak Safaipour
(74) *Attorney, Agent, or Firm* — Steve Roader, Esq.

(57) ABSTRACT

A handheld body, of a type of a smart phone, has a front side, a back side, two vertical edge sides, a height profile, a width profile, a thickness profile, and on the backside along the two vertical edge sides, the thickness profile has a variable thickness profile with at least three different thickness profiles, thereby the handheld body provides on the backside along the height profile the variable thickness profile for holding the device in a palm of a hand.

17 Claims, 13 Drawing Sheets

(56) References Cited

U.S. PATENT DOCUMENTS

| | | | | |
|---|---|---|---|---|
| 2012/0105761 A1* | 5/2012 | Lee | ............... | G02F 1/133308 |
| | | | | 349/58 |
| 2012/0106122 A1* | 5/2012 | Ryu | ............... | G02F 1/133608 |
| | | | | 362/19 |
| 2012/0122521 A1* | 5/2012 | Sato | ............... | H04M 1/0239 |
| | | | | 455/556.2 |
| 2013/0016486 A1* | 1/2013 | Allore | ............... | H04M 1/026 |
| | | | | 361/753 |
| 2013/0021265 A1* | 1/2013 | Selim | ............... | G06F 3/0487 |
| | | | | 345/173 |
| 2014/0022178 A1* | 1/2014 | Leung | ............... | G06F 3/01 |
| | | | | 345/169 |
| 2014/0189121 A1* | 7/2014 | Singhal | ............... | H04L 67/06 |
| | | | | 709/226 |
| 2014/0194169 A1* | 7/2014 | Singhal | ............... | H04M 1/0256 |
| | | | | 455/575.6 |
| 2015/0242673 A1* | 8/2015 | Singhal | ............... | G06K 9/00013 |
| | | | | 345/174 |
| 2016/0230929 A9* | 8/2016 | Singhal | ............... | G06F 1/1626 |
| 2016/0234358 A9* | 8/2016 | Singhal | ............... | H04M 1/0256 |
| 2016/0234477 A1* | 8/2016 | Singhal | ............... | H04N 13/0239 |
| 2016/0254940 A9* | 9/2016 | Singhal | ............... | H04L 67/06 |
| | | | | 709/226 |

\* cited by examiner

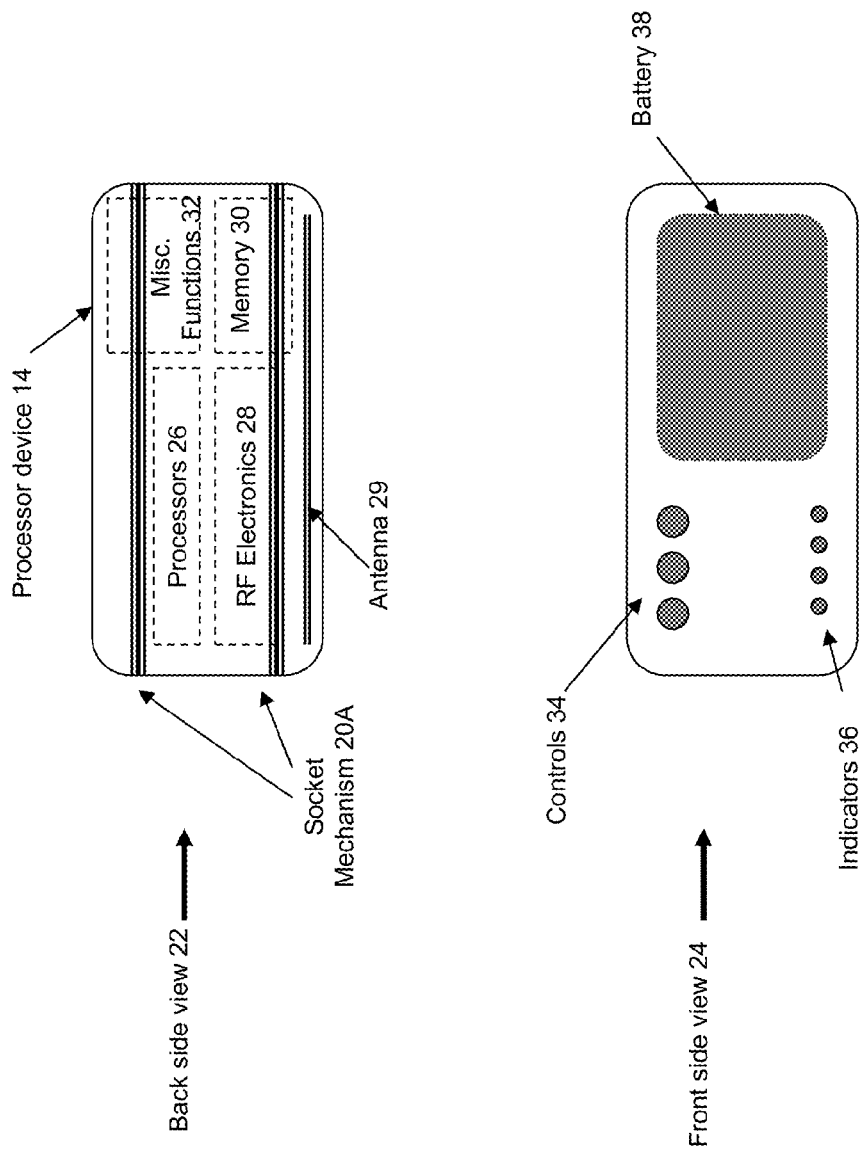

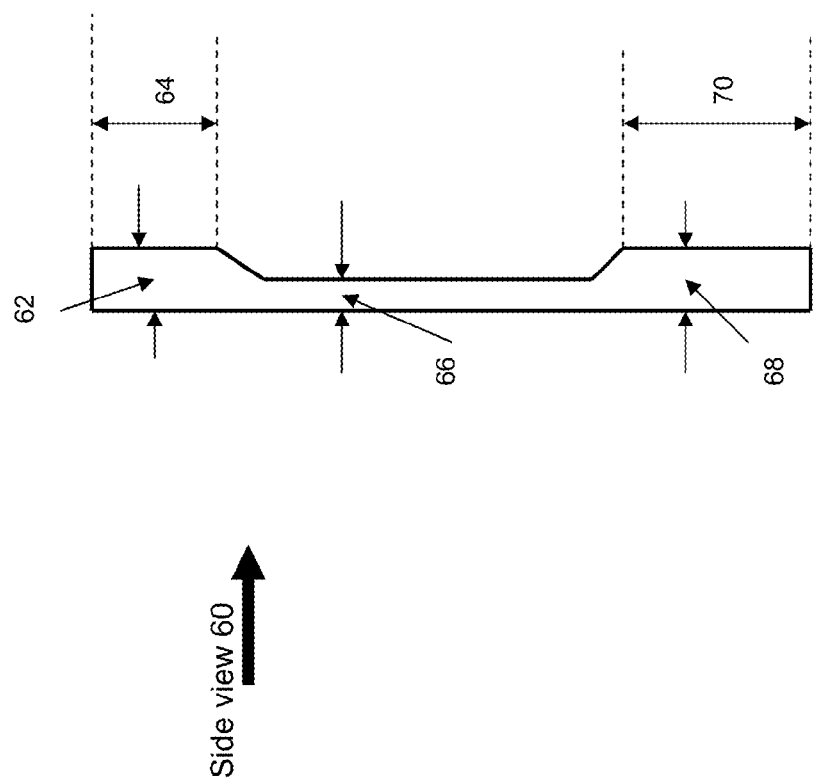

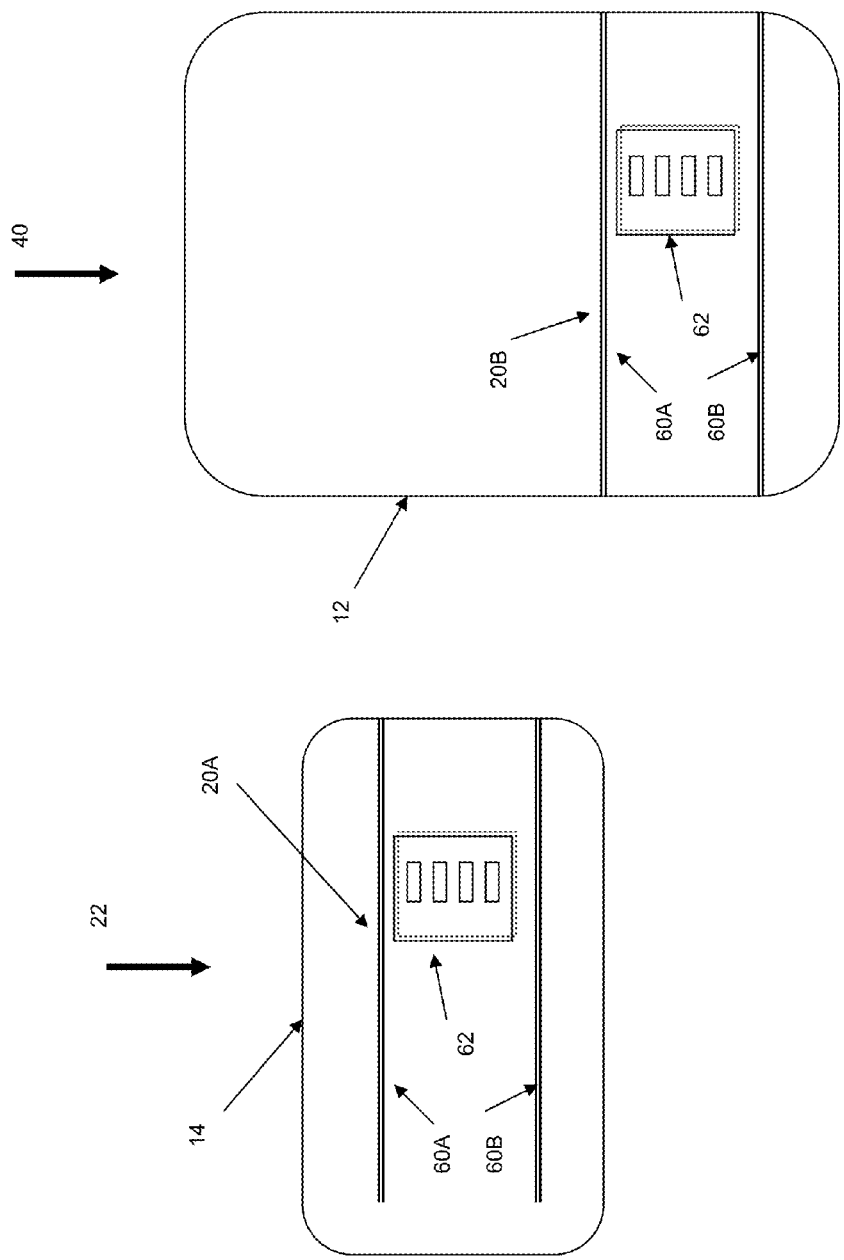

At step 100, designing a sensor body in a housing designed to be held in a human hand, the body has, sensors and interfaces that include at least a display screen, a touch screen, a microphone, speaker and a camera sensor.

At step 102, designing a separate processor body in a housing designed to be kept in personal possession and attachable to personal clothing has, processors, memory, operating systems, applications, antenna, hardware for GPS, camera electronics, and a RF module for operation with a wireless network.

At step 104, communicating with each other the sensor body and the processor body, each equipped with short distance wireless electronics, via the short distance wireless performing functions of the cell phone and other incorporated functions therein, thereby reducing the weight and size of the sensor body for holding in the hand.

At step 106, designing the processor body and sensor body attachable to each other via a socket mechanism.

At step 108, keeping track of each other, the sensor body and processor body with functions and generating an alarm when one moves away from the other exceeding a threshold distance.

At step 110, sizing the battery in each body to power the functions operating in each of the bodies.

At step 112, charging the sensor body battery when attached to the processor body.

At step 114, using the batteries of the sensor and processor bodies, when the bodies are attached, as primary and secondary batteries.

Figure 9

At step 100, designing a sensor body in a housing designed to be held in a human hand, the body has, sensors and interfaces that include at least a display screen, a touch screen, a microphone, speaker and a camera sensor.

At step 102, designing a separate processor body in a housing designed to be kept in personal possession and attachable to personal clothing has, processors, memory, operating systems, applications, antenna, hardware for GPS, camera electronics, and a RF module for operation with a wireless network.

At step 104, communicating with each other the sensor body and the processor body, each equipped with short distance wireless electronics, via the short distance wireless performing functions of the cell phone and other incorporated functions therein, thereby reducing the weight and size of the sensor body for holding in the hand.

At step 106, designing the processor body and sensor body attachable to each other via a socket mechanism.

At step 108, keeping track of each other, the sensor body and processor body with functions and generating an alarm when one moves away from the other exceeding a threshold distance.

At step 110, sizing the battery in each body to power the functions operating in each of the bodies.

At step 112, charging the sensor body battery when attached to the processor body.

At step 114, using the batteries of the sensor and processor bodies, when the bodies are attached, as primary and secondary batteries.

Figure 10

APPARATUS AND METHOD FOR AN ALTERNATE FORM-FACTOR HANDHELD SMART PHONE DEVICE

CROSS REFERENCE

This application is a divisional of application Ser. No. 13/735,326 that was filed on Jan. 7, 2013 of Tara Chand Singhal, titled, "Alternative Form-Factor Handheld Smart Phone Device". The application Ser. No. 13/735,326 is incorporated herein by reference.

Application Ser. No. 13/735,326 claims priority from Provisional Application Ser. No. 61/644,993, filed May 9, 2012, of Tara Chand Singhal, titled, "Alternative Form-Factor Handheld Smart Phone Device". The application Ser. No. 61/644,993 is incorporated herein by reference.

FIELD OF THE INVENTION

The embodiments teach a two part cell phone device with a sensor part body and a separate processor part body working in conjunction with each other, where only the sensor part body need be held in the hand and the processor part body is kept in personal possession of the device user.

BACKGROUND

Modern portable wireless devices such as smart phones have many embedded functions and embedded circuits that require a larger battery, more processors, and larger memory. These additions have made these smart phones relatively heavier and bigger in size than such devices of only a few years ago. That may make it uncomfortable for some people to utilize and carry such a device.

Further the industry in the past has provided different form-factors of these devices such as flip phones, slide phones and touch phones among others. The prevalent form-factor is a device with a single touch screen.

Hence, it is the objective of the embodiments herein to be able to provide alternate form-factors of such devices to be able to reduce weight and size as well as an objective to provide different form factors for conveniently holding the device in the palm of the hand.

SUMMARY

A mobile wireless communication device, such as a smart cell phone, is partitioned into two separate housings. One of these housings, called a sensor body is in a housing designed to be held in a human hand. The other of these housing is separate and is called a processor body.

In some embodiments, the separate processor body is designed to be kept in personal possession and attachable to personal clothing of the device owner. In some other embodiments the processor body is designed to be kept in the home or the vehicle of the device owner. In these embodiments, the processor body may be paired with a satellite link body that would enable the processor body to set up a data connection via a satellite link.

The sensor body is defined as the body that has sensors and interfaces that include at least a display screen, a touch screen, a microphone, speaker and a camera sensor. It may also include other application dependent interfaces and sensors such as, wireless readers, scanners etc. The sensor body may also include processors and memory and wireless interfaces that are necessary for the sensor body to function either as a stand alone device or as in conjunction with the processor body.

The processor body is defined as the body that has, processors, memory, operating systems, applications, antenna for the wireless network, hardware for GPS, camera electronics, and a RF module for operation with a wireless network.

The sensor body and the processor body may each be equipped with electronics for either short distance wireless, or wireless network connectivity, or WIFI connectivity, or all of them, that may be required for the sensor body and the processor body to perform functions of data communication, the cell phone, and other incorporated functions therein.

The sensor body and the processor body may use wireless connectivity between them that may include WIFI, wireless network devices and any other wireless technology that may be developed in the future.

In some embodiments, the sensor body may have a variable thickness profile along the length profile with a reduced thickness in the middle of the length profile relative to the thickness at the bottom and the top part of the sensor body. Prior art devices with touch screens have uniform thickness along their entire length profile. In these embodiments, the sensor body may have a weight distribution with heavier part of the sensor body positioned near the bottom of the body. These features, it is believed, make it easier and more convenient to hold the sensor body in the palm of the hand.

In some embodiments, the sensor body and processor body may have functions to keep track of each other and generate an alarm when one moves away from the other exceeding a threshold distance.

In some embodiments, the processor body and sensor body are attachable to each other via a socket mechanism. These features, it is believed, provide the sensor body with a reduced weight and thickness size for holding in the hand and thus making it more convenient to use.

These and other aspects of the embodiments herein are described and would become more clear with the help of the accompanying drawings and the accompanying description.

BRIEF DESCRIPTION OF THE DRAWINGS

Some of the novel features of this invention will be best understood from the accompanying drawings, taken in conjunction with the accompanying description, in which similar reference characters refer to similar parts, and in which:

FIG. 2A is block diagram that illustrates features of the present embodiment of the processor body;

FIGS. 2B and 2C are block diagrams that illustrates features of the present embodiment of the sensor body;

FIGS. 3A, 3B, 3C, 3C-1, 3D, and 3D-1 are block diagrams that illustrates features of the present embodiment of the invention of different modes of attaching the sensor body with the processor body;

FIG. 4 is a block diagram of the socket mechanism that may be used to attach the sensor body with the processor body.

FIG. 9 is a method diagram of the steps of the current embodiments of a two part cell phone device.

DESCRIPTION

Introduction

Figure 1:
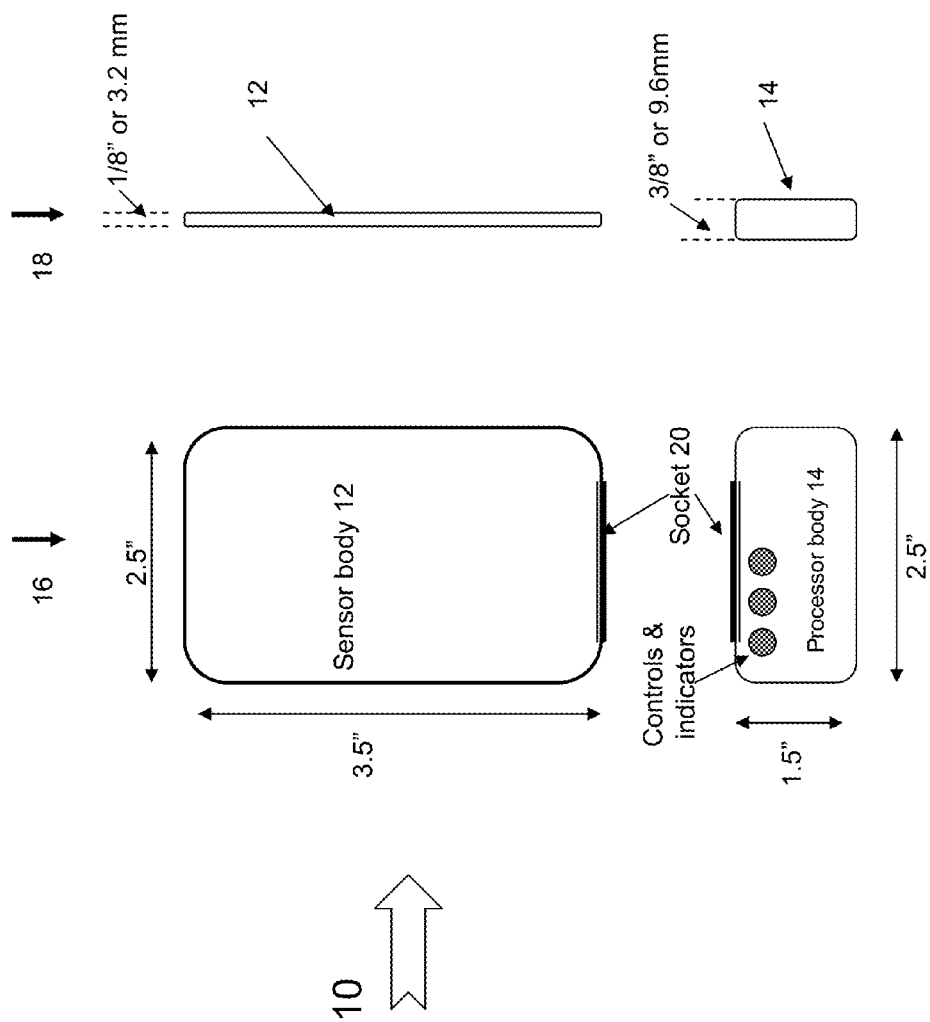
FIG. 1 is a block diagram that illustrates features of the present embodiments of the invention of a smart phone device having two separate bodies or housings.

With reference to FIG. 1, in a preferred embodiment, a portable wireless computing and communication device 10 such as a smart phone has been partitioned in to two different bodies, namely a sensor body 12 and a processor body 14.

FIG. 1, illustrates plan views 16 and side views 18 of these two different bodies. By separating the processor functions in a processor body 14 and the sensor functions in a sensor body 12 of the device 10, of a smart phone, it is believed, provides a better handheld profile of the sensor body 12. In some embodiments new applications that may not be possible with a prior art single body device may be provided with a separate sensor body 12 and a processor body 14.

With the separation of these functions of the sensors and processors of a smart phone device 10, in different bodies 12 and 14, the thickness profile of the sensor body 12 may be reduced from around currently prevailing notional 9 mm thickness to a notional 3 mm thickness. The sensor body 12 in its height profile may also be reduced in overall length.

As illustrated in FIG. 1, notional dimensions to illustrate the structure and form of the sensor body 12 and the processor body 14 are provided herein as a simplified illustration. The sensor body 12 may be 2.5 inches wide and 3.5 inches in height and ⅛" in thickness. The processor body 14 may be 1.5 inches in height, 2.5 inches wide and ⅜ inch in thickness based on housing the processor functions.

Further, the processor body 14 and sensor body 12 may be attached to each other with the help of socket mechanism 20. The socket mechanism 20 provides for both a physical and electrical interface mating of these two bodies.

In different modes of use of device 10, some users may like to use them as two separate bodies 12 and 14 and some users may prefer to use them as one device 10 where the sensor body and the processor body are attached to each other by a socket mechanism and some users may change from one mode to another mode of use as desired.

Figure 2B:
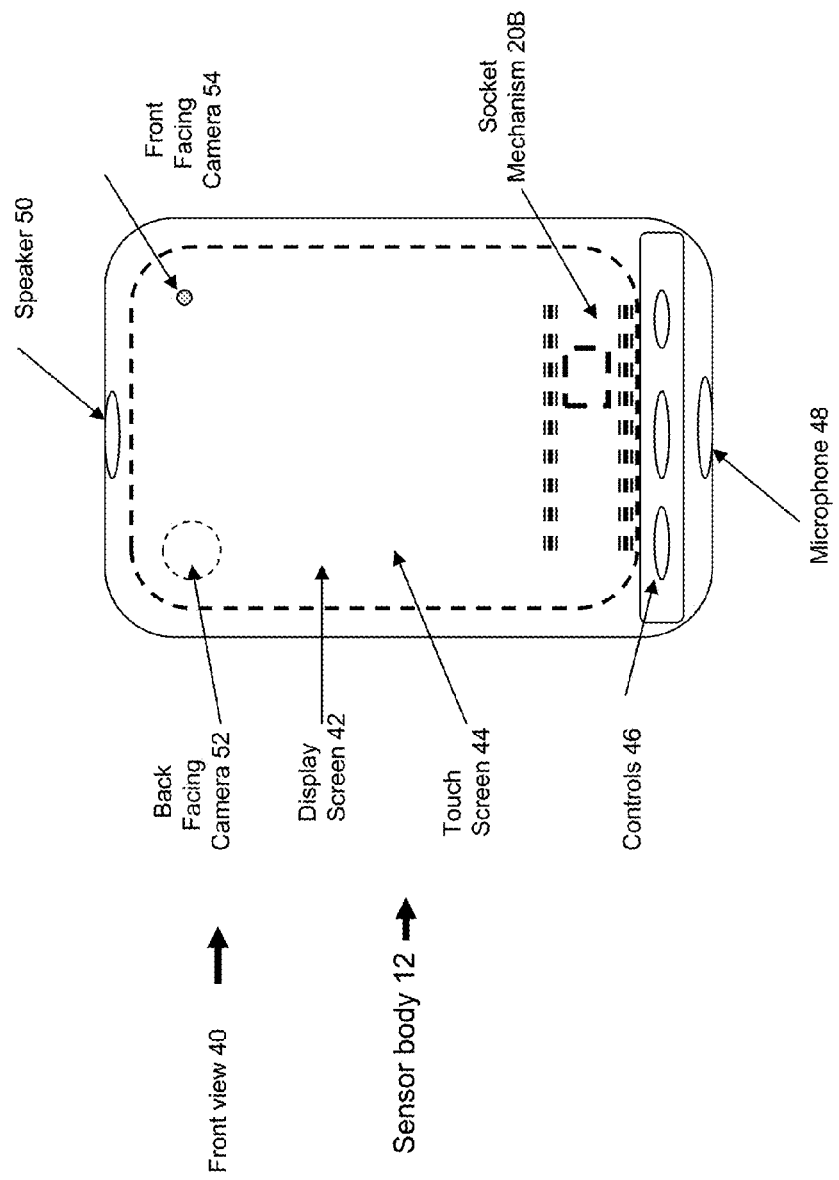

The details of these two bodies, the sensor body 12 and the processor body 14 are illustrated with reference to FIGS. 2A and 2B. These two bodies 12 and 14 may be attached to each other via socket mechanism 20 in different ways providing different profiles as illustrated later with reference to FIGS. 3A to 3D.

It is believed the sensor body 12 by itself or attached with the processor body 14 provides for a more elegant form-factor for holding and using the device 10 in the hand.

These and other aspects of the embodiments are described in detail herein where the headings are provided for reader convenience.

Processor Body 14

As illustrated in FIG. 2A, the processor body 14 is shown with a back side view 22 and a front side view 24. The back side view 22 is shown to have the processors 26, memory 30, operating systems (not shown), applications (not shown), antenna 29, hardware for GPS (not shown), camera electronics (not shown), and miscellaneous functions 32. There is a RF module 28 for operation with a wireless network (not shown) and the sensor body 12. The body 14 also has an interface socket (not shown) to interface the body 14 with other devices as there may also be miscellaneous other devices that may attach with the processor body 14.

The front side view 24 of the processor body 14 has controls 34, display indicators 36, and access to battery 38.

As illustrated in view 22, the processor body 14 also has a socket mechanism 20A to attach to a corresponding socket mechanism 20B with the sensor body 12.

The processor body 14 may be designed and manufactured using materials and circuits as in the prior art smart phone devices.

The interface mechanism interface may also be used as an electrical interface for charging the processor body 14 and for loading and removing program and data.

The processor body 14 may be kept in the personal possession of a user and may be attachable to the sensor body 12 by a socket mechanism. These different uses may call for different form factors of the processor body 14. That is, the processor body 14 may be sized for both independent operations as well as for operation with being attached to the sensor body 12.

The size profile of the processor body 14 that may be preferred for operation with being attached with the sensor body 12 is notionally one third as high as the sensor body and two and half times the thickness of the sensor body. That is, a processor body would be notionally 2.5" wide, 1.5" high and ⅜" thick, when the sensor body is 2.5" wide, 3.5" high and ⅛" thick. Other sizes are not ruled out and these dimensions are illustrative of one of the many possible embodiments.

Sensor Body 12

As illustrated with reference to FIG. 2B, the front side view 40 of the sensor body 12 has sensors and interfaces that include at least a display screen 42, a touch screen 44, a microphone 48, speaker 50, a back camera sensor 52, a front camera sensor 54, controls 46, and a socket mechanism 20B. The socket mechanism 20B is positioned at the back side of the sensor body 12 as is the back facing camera sensor 52.

The sensor body 12 may be designed and manufactured using materials and circuits as in the prior art smart phone devices.

FIG. 2C illustrates an alternative embodiment of the sensor body 12 with variable thickness profile along the length profile of the sensor body 12. What is shown is a side view 60. The thickness profile of the sensor body 12 is varied to accommodate different hardware that may be present in the sensor body.

As an illustration, a front and a back facing camera is present in the top area 62 of the sensor body. There may be other sensors that may be present in the top area 62 of the sensor body 12. Therefore to accommodate these sensors in the top part of the sensor body 12, for a length 64 on the top part, the thickness 62 of the sensor body 12 is notionally ¼ inch for a height 64 to accommodate these sensors and other hardware such as switches and controls that may be positioned on the bezel of the sensor body 12.

The sensor body 12 is of thickness 66 in the middle 66 of the profile and may be notionally ⅛" thick. The thickness 68 of the sensor body 12 for a length 70 at the bottom of the profile may be notionally ⅜ inch thick to accommodate battery and the socket mechanism 20, as well as processor and memory inside the sensor body 12.

If the height profile of the sensor body 12 is 5", then of this profile, the top part 64 is notionally ¾" long and the bottom part 70 is notionally 1.25 inches long. That means the middle part of the profile extends for a height of 3.00".

It is believed that such a variable profile along with its weight distribution being bottom heavy would be much easier to hold in the palm of the hand. These dimensions are notional and other dimensions are not ruled out.

Smart Phone Device 10

The sensor body 12 and the processor body 14 are each equipped with a short distance wireless electronics, communicate with each other via the short distance wireless to perform functions of the cell phone and other incorporated functions therein.

The sensor body 12 and processor body 14 may use short distance wireless electronics such as WiFi or any other short distance wireless technology that may be developed in the future to communicate with each other. WiFi makes possible wireless communication over a few hundred or more distance between the two bodies.

Figure 5:
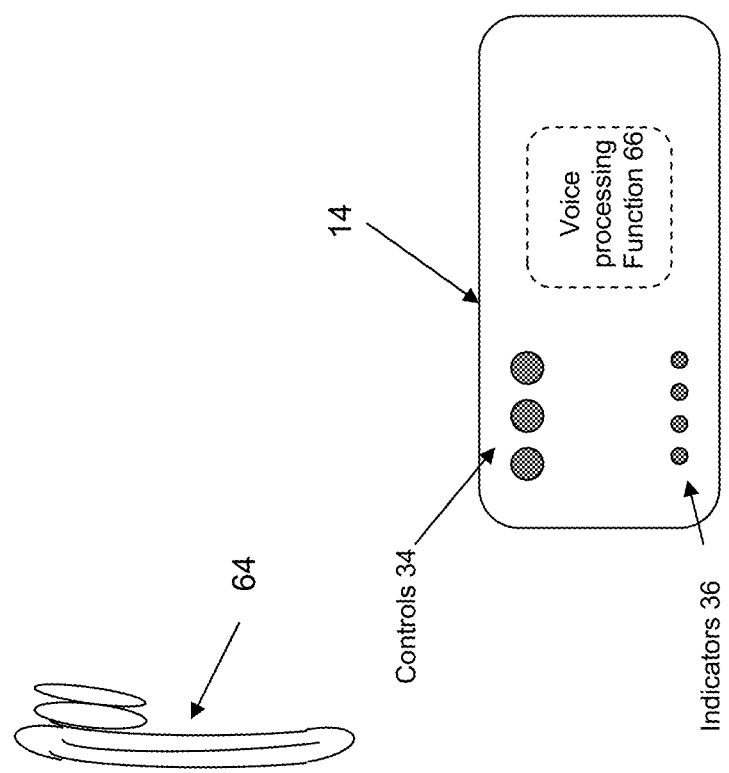
FIG. 5 is a block diagram of the processor body working with a Blue Tooth ear piece.

As illustrated in another embodiment with reference to FIG. 5, the processor body 14 may also work with a prior art BlueTooth ear piece 64. The processor body 14 may be equipped with an advanced voice processing function 66 that may obviate the need for a sensor body 12 for some users. The voice processing function may be able to provide all the features of the sensor body 12 except the visual display screen and the camera.

Socket Mechanism 20

FIGS. 3A-D show simplified illustrations of different ways of attaching the processor body 14 with the sensor body 12. These provide different form factors of the device 10 that may appeal to different users.

Figure 3B:
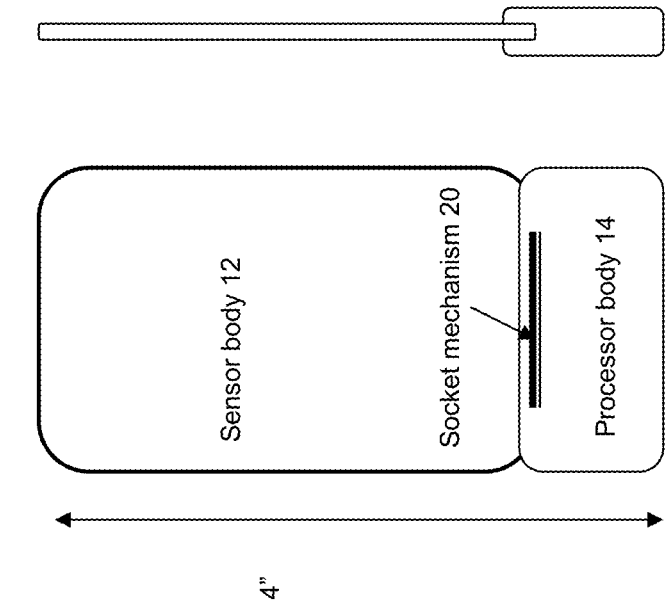
Figure 3A:
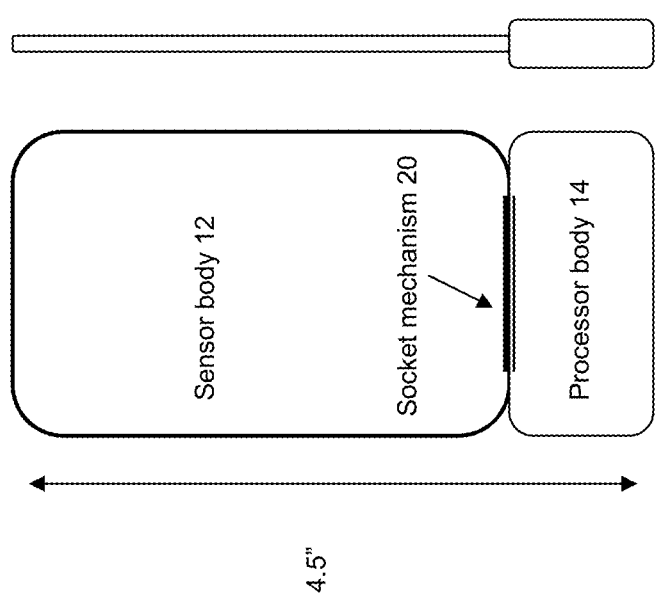
Figure 3D:
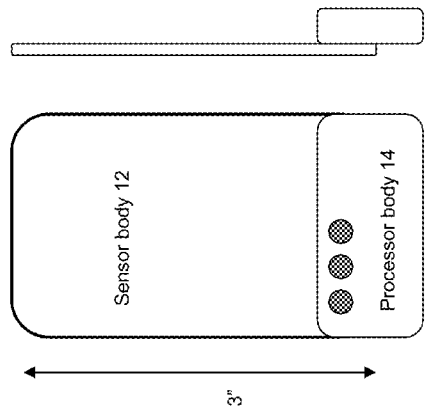
Figures 1, 3D:
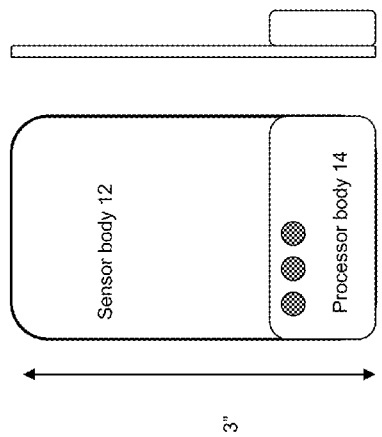
Figure 3C:
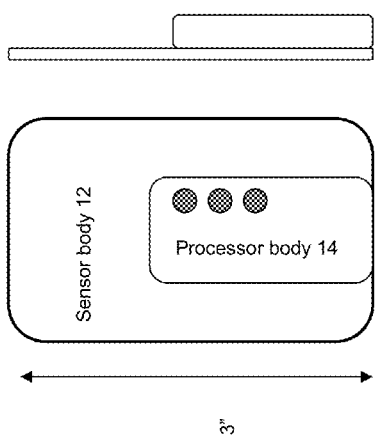
Figures 1, 3C:
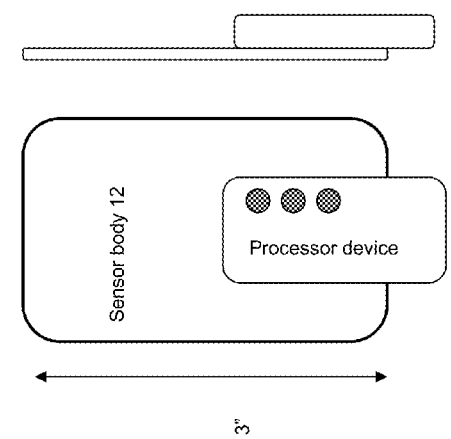

FIGS. 3A and 3B illustrate attachment where the processor body 14 is placed at the bottom of the sensor body 12. FIG. 3C illustrate attachment where the processor body 14 is positioned vertically at the backside of the sensor body 12. FIG. 3D illustrates attachment where the processor body 14 is positioned horizontally at the back of the sensor body 12.

Different attachments of sensor body 12 and processor body 14 with each other have been illustrated in FIGS. 3A to 3D. These embodiments provide for a bottom heavy weight profile of the device 10. It is believed that such a weight distribution profile is easier to hold and handle in the cradle of the palm of the hand. FIG. 3C shows an embodiment that may be easiest to cradle in the palm of the hand.

In contrast, prior art devices have an even weight profile and thickness of the device across its entire profile. The embodiments as in FIGS. 3A to 3D may be preferred by many users as having a lighter weight and thinner profile on the top and a heavier and a thicker profile at the bottom end of the device 10. Further the user also has the freedom to separate the two bodies and use them in that manner as has been described earlier.

FIG. 4 illustrates a socket mechanism. The backside view 22 of the processor body 14 and the backside view 40 of the sensor body 12 are shown. The socket mechanism 20A and 20B have grooves 60A and 60B to align the movement of the sensor body 12 with the processor body 14 relative to each other and an electrical interface 62. The electrical interface 62 is contact based and may be similar to what is used in cell phones for the battery.

In general, the socket mechanism is considered prior art, as prior art provides many types of socket mechanisms for both physically and electrically interfacing two bodies. An example is the different phone bodies, with slide, flip and rotate mechanism that slide or flip or pivot one body against the other. However, the specific design and use of the socket mechanism unique to the embodiments is not considered prior art.

Applications

The two part cell phone device 10 may be used in different applications in different ways. Some of these are illustrated with the help of FIGS. 6, 7, and FIG. 8. Other applications are not ruled out.

Figure 6:
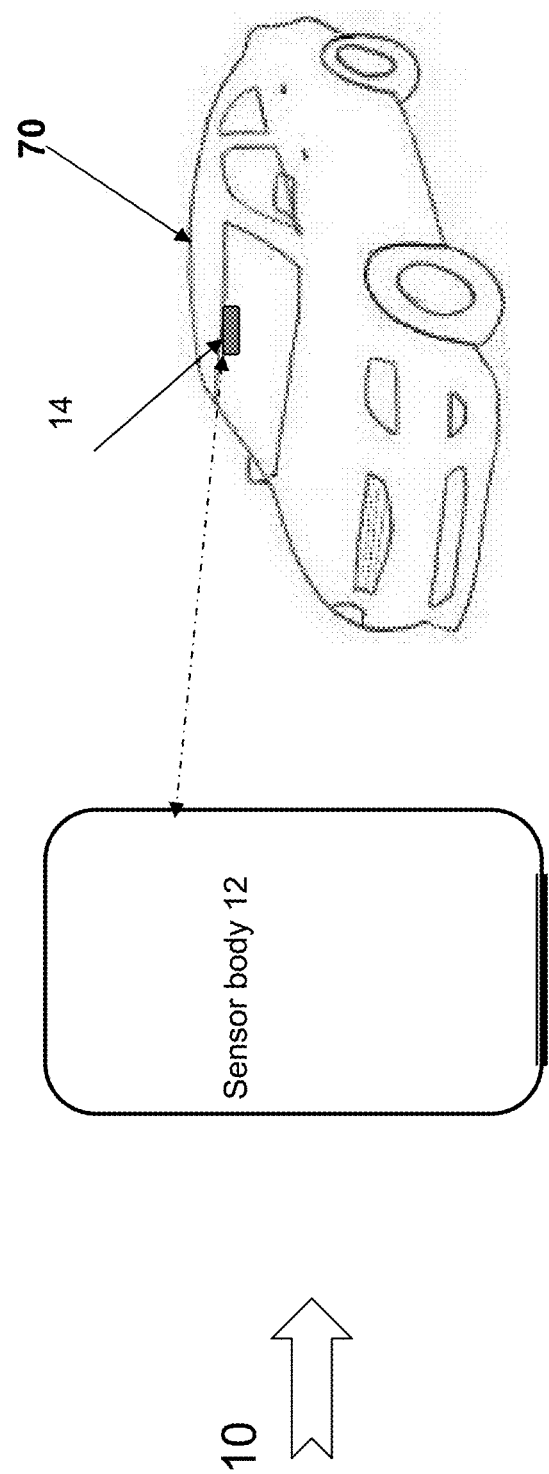
FIG. 6 is a block diagram of the processor body positioned inside a vehicle.

FIG. 6 shows the processor body 14 positioned inside a personal vehicle 70 of the cell phone owner. In this embodiment, the processor body 14 may be powered by the vehicle battery or by its own battery or a combination of these batteries.

In a personal vehicle driven culture, a personal vehicle is always nearby, either at home or a work place or at a shopping or an entertainment place, making it convenient and practical to use the two-part cell phone in this manner.

Figure 7:
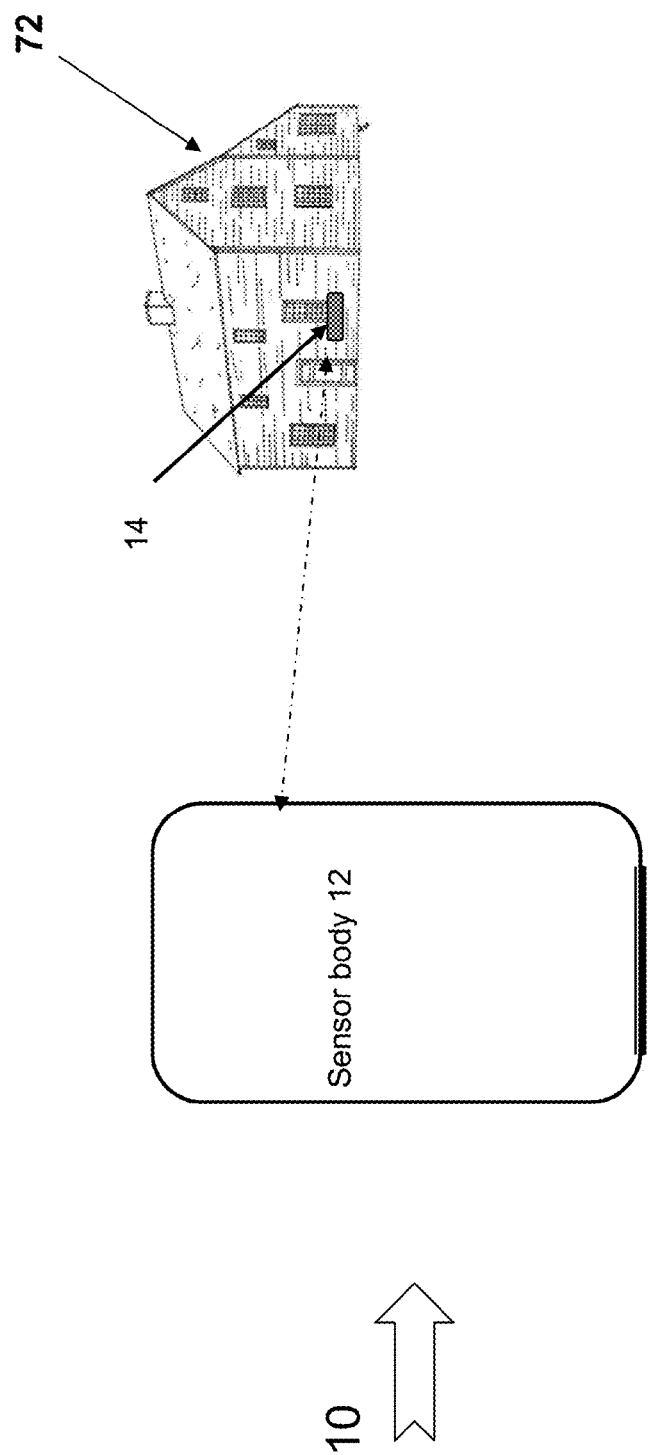
FIG. 7 is a block diagram of the processor body positioned inside a home.

FIG. 7 shows the processor body 14 positioned inside a personal home 72 of the cell phone owner. In this embodiment, the processor body 14 may be powered by the house power or by its own battery or a combination of these power sources.

In this embodiment, a person may move about in and around the vicinity of his personal home and use the two-part cell phone.

In these embodiments if the distance between the sensor body 12 and processor body 14 exceeds a threshold, the user via the sensor body 12 may be alerted. The technology of maintaining a threshold distance between the sensor body and the processor body is considered prior art and is used in many prior art applications.

The sensor body 12 may also have RF electronics that provide wireless network connectivity. Alternatively, when the sensor body 12 detects that it is out of range of the processor body 14, the sensor body 12 may switch to its own RF electronics that provide connectivity to the wireless network.

Figure 8:
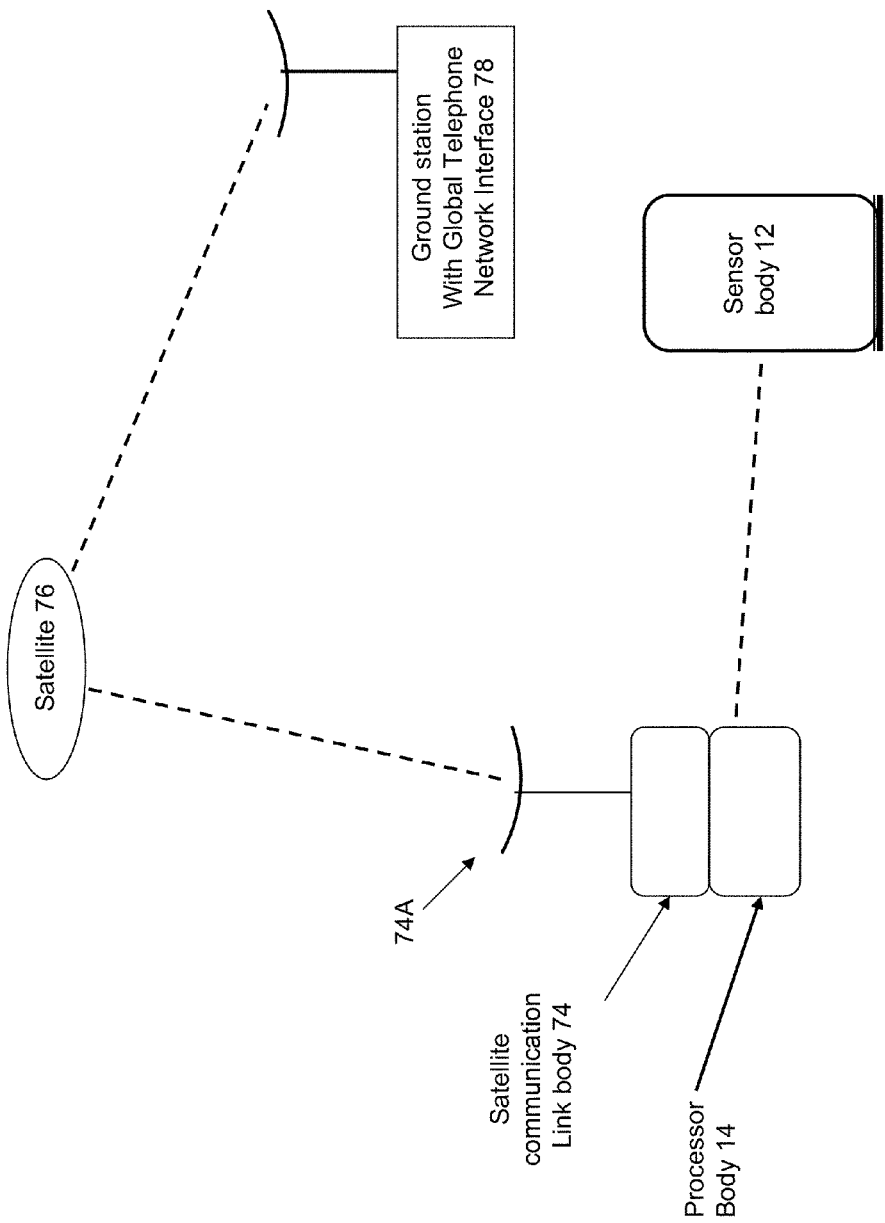
FIG. 8 is a block diagram of the processor body with communication link body and an antenna capable of communicating with a satellite.

FIG. 8 shows another embodiment where the processor body 14 may be coupled with a satellite communication module body 74. The satellite communication module 74 has a satellite antenna 74A and electronic (not shown) to establish connection with a satellite 76 for a satellite based phone connection working in conjunction with a ground station 78 connected to the telephone network.

The embodiment as illustrated in FIG. 8 may be used by positioning the satellite link body 74 in a personal vehicle as in FIG. 6 or in a personal home as in FIG. 7. In either of these modes, the processor body 14 is programmed to use the satellite communication link body 74 when it cannot find a nearby cellular tower.

This situation may arise, when the cell phone owner travels in his vehicle to remote areas that lack the cellular telephone infrastructure. The situation may also arise when the cellular network is down in a given geographic area due to any number of reasons to include physical damage to the network due to weather related conditions.

The technology of satellite communication link as would be in link body 74 is prior art and has been used in prior art satellite phones. In the embodiments described herein, the prior art satellite phone functions have been split into three separate components, the sensor body 12, the processor body 14 and the satellite communication link body 74, making a satellite phone feature of the processor body 14 more convenient to use and providing an assurance that a telephone connection would be available in an emergency when the cellular network has been damaged due to severe weather conditions.

A communication device, such as a smart cell phone has a sensor body in a housing designed to be held in a human hand. The sensor body has sensors and interfaces that include at least a display screen, a touch screen, a microphone, speaker and a camera sensor. The device has a separate processor body in a housing designed to be kept in personal possession and attachable to personal clothing has, processors, memory, operating systems, applications, antenna, hardware for GPS, camera electronics, and a RF module for operation with a wireless network.

The sensor body and the processor body, each equipped with RF wireless electronics, communicate with each other via the RF wireless to perform functions of the cell phone and other incorporated functions therein; thereby the sensor body has a reduced weight and thickness size of the sensor body for holding in the hand.

The processor body and sensor body are attachable to each other via a socket mechanism. The sensor body and processor body have functions to keep track of each other and generate an alarm when one moves away from the other exceeding a threshold distance.

The each body has a battery that is sized to power the functions operating in each body. The sensor body battery is chargeable when attached to the processor body. The batteries of the sensor and processor bodies' function, when the bodies are attached, function as primary and secondary batteries.

A communication device, such as a smart cell phone has a sensor body in a housing designed to be held in a human hand, the body has, sensors and interfaces that include at least a display screen, a touch screen, a microphone, speaker and a camera sensor. The device has a separate processor body in a housing designed to be kept in a vehicle has, processors, memory, operating systems, applications, antenna, hardware for GPS, camera electronics, and a RF module for operation with a wireless network. The sensor body and the processor body, each equipped with RF wireless electronics, communicate with each other via the RF wireless to perform functions of the cell phone and other incorporated functions therein; thereby the sensor body has a reduced weight and thickness size of the sensor body for holding in the hand.

The processor body in the vehicle is integrated with the vehicle electronics for power and antenna functions of the processor body. The processor body has communication electronics to communicate with a satellite to connect to a global telephone network without reliance on terrestrial based cellular towers.

The processor body has electronics to ascertain availability of terrestrial network and when not available switch to a satellite based network, when the terrestrial towers are down in an emergency or when the vehicle is an area without availability of terrestrial towers. The processor body has function to send a message to the sensor body which network is being used at a given time.

The handheld mobile wireless device has a handheld body with a length profile, a width profile and a thickness profile that has the thickness profile that is variable along the length profile of the handheld body. The variable thickness profile has a thickness A for a length A', a thickness B for a length B' and a thickness C for a length C', where A and C are greater than B. The length A' of the handheld body has sensors that include cameras, speakers, and scanners. The length C' of the handheld body is used to store battery and circuits making C' heavier than A', thereby the handheld body provides a length and weight profile convenient for holding in the palm of the hand.

FIG. 10 illustrates the method steps, where all the steps may not be used or used in the order specified.

At step 100, designing a sensor body in a housing designed to be held in a human hand, the body has, sensors and interfaces that include at least a display screen, a touch screen, a microphone, speaker and a camera sensor.

At step 102, designing a separate processor body in housing designed to be kept in personal possession and attachable to personal clothing has, processors, memory, operating systems, applications, antenna, hardware for GPS, camera electronics, and a RF module for operation with a wireless network.

At step 104, communicating with each other the sensor body and the processor body, each equipped with short distance wireless electronics, via the short distance wireless performing functions of the cell phone and other incorporated functions therein, thereby reducing the weight and size of the sensor body for holding in the hand.

At step 106, designing the processor body and sensor body that are attachable to each other via a socket mechanism.

At step 108, keeping track of each other, the sensor body and processor body with functions and generating an alarm when one moves away from the other exceeding a threshold distance.

At step 110, sizing the battery in each body to power the functions operating in that body.

At step 112, charging the sensor body battery when attached to the processor body.

At step 114, using the batteries of the sensor and processor bodies, when the bodies are attached, as primary and secondary batteries.

In summary, the embodiments herein are on a form-factor of a smart phone device that provide for two different bodies of a smart phone device, where one body is used as a sensor interface and the other is used as a processor, and where the bodies may be used separately or may be attached to each other based on user convenience and mode of use. These it is believed provide more user friendly form-factors for the sensor body that is held in the palm of the human hand when used and provides for lighter and/or smaller size of the sensor body.

While the particular embodiments, as illustrated herein and disclosed in detail are fully capable of obtaining the objective and providing the advantages herein before stated, it is to be understood that it is merely illustrative of the presently preferred embodiments of the invention and that no limitations are intended to the details of construction or design herein shown other than as described in the appended claims.

The invention claimed is:

1. An electronic device comprising:
a processor, wherein the electronic device has ergonomic features for holding the electronic device in a palm of a hand, the ergonomic features comprising:
   a. a variable thickness profile along a backside of the electronic device, wherein the electronic device has a front side with a display screen and a touch screen, the back side, two vertical edge sides, a height profile, a width profile, a thickness profile, and on the backside along the two vertical edge sides, the thickness profile has at least three different thickness profiles including a thickness A, a thickness B and a thickness C;
   b. the height profile for a height profile part A', the thickness profile has the thickness A, for a height profile part B', the thickness profile has the thickness B and for a height profile part C', the thickness profile has the thickness C;
   c. the thickness profile A is greater than the thickness profile B and the thickness profile A and the thickness profile C are greater than the thickness profile B, and wherein the thickness profile C is substantially less than or equal to half an inch, thereby the electronic device provides an ergonomic height profile on the backside of the device for holding the device in the palm of the hand.

2. The device as in claim 1 further comprising:
the thickness profile part A transitions to the thickness profile part B with a downward slope and the thickness profile part B transitions to the thickness profile part C with an upward slope, thereby the electronic device provides an ergonomic thickness profile along the height profile for holding in the palm of the hand.

3. The device as in claim 1 further comprising:
for the electronic device of a smart phone, the thickness profile A is substantially ¼ inch, the thickness profile B is substantially ⅛" and the thickness profile C is substantially ⅜".

4. The device as in claim 1 further comprising:
the thickness profile A for the height profile part A' of the electronic device has positioned therein sensors that include at least one camera, at least one speaker, and at least one scanner.

5. The device as in claim 1 further comprising:
the thickness profile C for the height profile C' of the electronic device has positioned therein, at least a battery, a storage memory, processing circuits making thickness profile C heavier than thickness profile A, thereby the electronic device provides an ergonomic distributed weight profile convenient for holding in the palm of the hand.

6. The device as in claim 1 further comprising:
the backside has a protective encasing surface.

7. A method for an electronic device comprising:
providing a processor, wherein the electronic device has ergonomic features for holding the electronic device in a palm of a hand, the ergonomic features comprising the steps of:
a. providing a variable thickness profile along a backside of the electronic device, wherein the electronic device has a front side with a display screen and a touch screen, the back side, two vertical edge sides, a height profile, a width profile, a thickness profile, and on the backside along the two vertical edge sides, the thickness profile has at least three different thickness profiles including a thickness A, a thickness B and a thickness C;
b. the height profile for a height profile part A', the thickness profile has the thickness A, for a height profile part B', the thickness profile has the thickness B and for a height profile part C', the thickness profile has the thickness C;
c. the thickness profile A is greater than the thickness profile B and the thickness profile A and the thickness profile C are greater than the thickness profile B, and wherein the thickness profile C is substantially less than or equal to half an inch, thereby the electronic device provides an ergonomic height profile on the backside of the device for holding the device in the palm of the hand.

8. The method for the device as in claim 7 further comprising: transitioning the thickness profile part A to the thickness profile part B with a downward slope and transitioning the thickness profile part B to the thickness profile part C with an upward slope, thereby the electronic device provides an ergonomic thickness profile along the height profile for holding in the palm of the hand.

9. The method for the device as in claim 7 further comprising the steps of:
providing for the electronic device of a smart phone, the thickness profile A is substantially ¼ inch, the thickness profile is substantially ⅛" and the thickness profile C is substantially ⅜".

10. The method for the device as in claim 7 further comprising the steps of:
providing for the thickness profile A for the height profile part A' of the electronic device positioned therein sensors that include at least one camera, at least one speaker, and at least one scanner.

11. The method of the device as in claim 7 further comprising the steps of:
the thickness profile C for the height profile C' of the electronic device has positioned therein, at least a battery, a storage memory, processing circuits making thickness profile C heavier than thickness profile A, thereby the electronic device provides an ergonomic distributed weight profile convenient for holding in the palm of the hand.

12. The method for the device as in claim 7 further comprising the steps of:
the backside has a protective encasing metal surface.

13. An electronic device comprising:
a processor;
ergonomic features for holding the electronic device in a palm of a hand, the ergonomic features comprising:
a variable thickness profile along a backside of the electronic device, wherein the device has a front side with a display screen and a touch screen, the back side, two vertical edge sides, a height profile, a width profile, a thickness profile, and on the backside along the two vertical edge sides, the thickness profile has a variable thickness profile with at least three different thickness profiles including a thickness A, a thickness B and a thickness C, and wherein the thickness profile A is greater than the thickness profile B and the thickness profile C is substantially less than or equal to half an inch, thereby the electronic device provides on the backside along the height profile the ergonomic feature of the variable thickness profile for holding the device in the palm of the hand.

14. The device as in claim 13 further comprising:
the thickness profile varies substantially from ⅛" to ⅜', with a top part of the device substantially of /", a middle part of the device substantially of ⅛ inch, and a bottom part of the device of substantially ⅜".

15. The device as in claim 13 further comprising:
a first thickness profile of the electronic device has positioned therein, sensors that include at least one camera, at least one speaker, and at least one scanner.

16. The device as in claim 13 further comprising:
a third thickness profile has positioned therein of the electronic device, at least a battery, a storage memory, processing circuits making the third thickness profile heavier than the first thickness profile, thereby the electronic device provides an ergonomic distributed weight profile for holding in the palm of the hand.

17. The device as in claim 13 further comprising:
the first thickness profile part transitions to a second thickness profile with a downward slope and the second thickness profile part transitions to the third thickness profile with an upward slope, thereby the electronic device provides an ergonomic thickness profile along the height profile for holding in the palm of the hand.

\* \* \* \* \*